(12) United States Patent
Anderson et al.

(10) Patent No.: US 6,778,205 B2
(45) Date of Patent: Aug. 17, 2004

(54) METHODS AND APPARATUSES FOR FORMING VISIBLE LABELS ON OBJECTS USING A WRITABLE OPTICAL DISC DRIVE

(75) Inventors: Bradley J. Anderson, Boise, ID (US); Bruce L. Johnson, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 162 days.

(21) Appl. No.: 10/087,122

(22) Filed: Feb. 28, 2002

(65) Prior Publication Data

US 2003/0161224 A1 Aug. 28, 2003

(51) Int. Cl.$^7$ .................................................. B41J 2/47
(52) U.S. Cl. .............................................. 347/251
(58) Field of Search .................. 347/251, 252, 347/255, 257, 262, 263, 264, 238, 240, 241, 242, 245, 141, 112, 186, 200, 221; 346/139 R, 139 C

(56) References Cited

U.S. PATENT DOCUMENTS

| 5,317,337 | A | 5/1994 | Ewaldt |
| 5,518,325 | A | 5/1996 | Kahle |
| 5,616,447 | A | 4/1997 | Arioka |
| 6,020,977 | A | 2/2000 | Kim |
| 6,074,031 | A | 6/2000 | Kahle |
| 6,109,324 | A | 8/2000 | Bugner et al. |
| 6,501,718 | B1 | 12/2002 | Ono et al. |
| 6,534,142 | B1 * | 3/2003 | Hummell et al. |
| 2002/0045177 | A1 | 4/2002 | Oshima et al. |
| 2002/0048241 | A1 | 4/2002 | Kumagai et al. |
| 2002/0191517 | A1 | 12/2002 | Honda et al. |
| 2003/0107959 | A1 | 6/2003 | Norton et al. |
| 2003/0108708 | A1 | 6/2003 | Anderson et al. |

FOREIGN PATENT DOCUMENTS

| JP | 9-123606 | 5/1997 |
| JP | 9-123607 | 5/1997 |
| JP | 9-265760 | 10/1997 |
| JP | 9-306144 | 11/1997 |
| JP | 10-320963 | 12/1998 |
| JP | 11-003543 | 1/1999 |
| JP | 2000155989 | 6/2000 |
| JP | 2000173096 | 6/2000 |
| JP | 2000173238 | 6/2000 |
| JP | 2002216396 | 8/2002 |

* cited by examiner

*Primary Examiner*—Raquel Yvette Gordon

(57) ABSTRACT

Methods and apparatuses are provided that allow a label to be formed on optical disc or other like object using a write laser mechanism within an optical disc drive or like device.

43 Claims, 3 Drawing Sheets

METHODS AND APPARATUSES FOR FORMING VISIBLE LABELS ON OBJECTS USING A WRITABLE OPTICAL DISC DRIVE

TECHNICAL FIELD

The present invention relates generally to writable optical disc drive devices, and more particularly to methods and apparatuses that allow visible labels to be formed on objects using a write laser within the optical disc drive device.

BACKGROUND

Conventional optical data storage devices are configured to read data from and write data to a removable optical disc. Currently, writable compact discs (CD-R) and re-writable compact discs (CD-RW) are popular formats for personal computers and other like devices. Re-writable digital versatile discs (DVDs), known as DVD-RAMs (random access memory), DVD-R, DVD-R/W, etc., are also becoming more popular as the price of the applicable DVD devices become more affordable.

The process of writing data to an optical disc is often referred to as "burning" the disc, since a beam from a write laser is used to selectively raise the temperature of certain materials within the optical disc such that the materials are altered in some manner. Consequently, features are formed on the disc. These features represent binary data values, i.e., 1's and 0's, which can subsequently be detected (read) using a read laser.

After burning in a CD-R, for example, the user may decide to label the CD-R disc to reflect the data files that have been stored on the disc. Here, the user has a choice when it comes to labeling the CD-R disc. For example, the user may write on the non-data side of the CD-R disc. Most disc manufacturers, for example, provide a special area on the non-data side of the disc that is designed to be written on by either a pen or pencil. Some of the drawbacks to this labeling approach are that there may not enough space to write everything down and the ink/graphite may get smeared or worse wiped off. Moreover, the user is required to take the necessary time to manually write information down on the disc. Also, it may be difficult for others to read the handwriting on the disc.

There are computer programs available that can be used to produce labels. The labels are then printed out on special label print media using a printer. The special label print media includes an adhesive back that allows the user to attach the printed label on top of the non-data side of the disc. Some of the drawbacks to this labeling approach are that the printed labels may unpeel over time, which could cause problems within the disc drive. If the ink on the printed label is water soluble, then the label may become smeared when handled. Also, if the printed label is not applied correctly (e.g., not centered), then as the disc is spun at a high rate there can be a balancing problem that may lead to damage of the disc drive. Indeed, there are special printed label attachment tools available for aligning the printed label with the disc. Unfortunately, many of these alignment tools can be difficult to operate correctly and therefore take time to master.

If the user is burning a lot of discs, then the user may decide to silk screen labels onto the discs. This is a much more complex task and can be much more expensive when compared to the other labeling approaches described above. Hence, unless thousands of discs are going to be labeled the same, then this may not be the best choice. Also, there is chance that the silk screened ink(s) may get scratched or otherwise wear off over time.

For the above stated reasons and others, there is a need for improved methods and apparatuses that can be used to label optical discs.

SUMMARY

Methods and apparatuses are provided that allow a label to be formed on an optical disc or other like object using a write laser mechanism within an optical disc drive.

In accordance with certain implementations of the present invention, for example, a method for labeling an object using an optical disc drive having at least one write laser mechanism is provided. The method includes positioning a label side of the object such that the label side can be written to by the write laser mechanism, providing label data to the write laser mechanism, selectively spinning the object, and causing the write laser mechanism to write to and thereby visibly alter at least a portion of the label side of the object, based on the label data.

In accordance with still other implementations of the present invention, an optical disc drive is provided. The optical disc drive includes a first write laser mechanism that is configured to write data to a data side of an optical disc, and a second write laser mechanism that is configured to write label data to a label side of an optical disc.

The above stated needs and others are met by way of a method that includes positioning an optical disc having a label side and a data side into an optical disc drive having a write laser mechanism, and writing label data to the label side using the write laser mechanism. In certain implementations, the method includes, prior to positioning the optical disc in optical disc drive, writing data to the data side using the write laser mechanism. In other implementations, the method includes, after writing the label data to the label side, repositioning the optical disc in optical disc drive and then writing data to the data side using the write laser mechanism. In certain implementations, the method also includes selecting the label data based on data associated with the data side.

The above stated needs and others are met, for example, by an object that is suitable for use in an optical disc drive having a read laser mechanism and a write laser mechanism. The object includes a layer of support material having a first surface and a second surface. A multiple-layer data storage structure that can be read by the read laser mechanism is arranged on the first surface. A layer of labeling material is arranged on the second surface. Here, the layer of labeling material includes at least one color. At least one layer of substantially opaque material is arranged on the layer of labeling material. The layer of substantially opaque material is configured to be written to by the write laser mechanism such that selected portions of the layer of labeling material are made visible through the layer of substantially opaque material as a result of the labeling process.

In accordance with certain other implementations, instead of an opaque material at least one layer of substantially transparent material is arranged on the layer of labeling material. This layer of substantially transparent material is configured to be written to by the write laser mechanism such that selected portions of the layer of labeling material are made no longer visible through the layer of substantially opaque material as a result of the labeling process.

The above stated needs and others may also be satisfied by an apparatus for use with an optical data storage disc having a laser writable label side and a data side. The apparatus includes a write laser mechanism configurable to selectively apply a laser beam to the laser writable label side of the optical data storage disc based on label data. The apparatus further includes logic that is operatively coupled to the write laser mechanism and configured to identify the label data and provide the label data to the write laser mechanism. Here, the label data corresponds to at least one feature to be formed by the write laser mechanism on the laser writable label side of the optical data storage disc. The feature may include, for example, visible text, graphics, and/or images.

In still other implementations of the present invention, a computer-readable medium having computer-executable instructions for performing certain acts is provided. The acts include identifying label data corresponding to at least one feature to be formed using a laser writable label side of an optical data storage disc having the laser writable label side and a data side, and providing the label data to a write laser mechanism configurable to selectively apply a laser beam to the laser writable label side of an optical data storage disc, based on the label data.

BRIEF DESCRIPTION OF THE DRAWINGS

A more complete understanding of the various methods and apparatuses of the present invention may be had by reference to the following detailed description when taken in conjunction with the accompanying drawings wherein.

DETAILED DESCRIPTION

Figure 1:
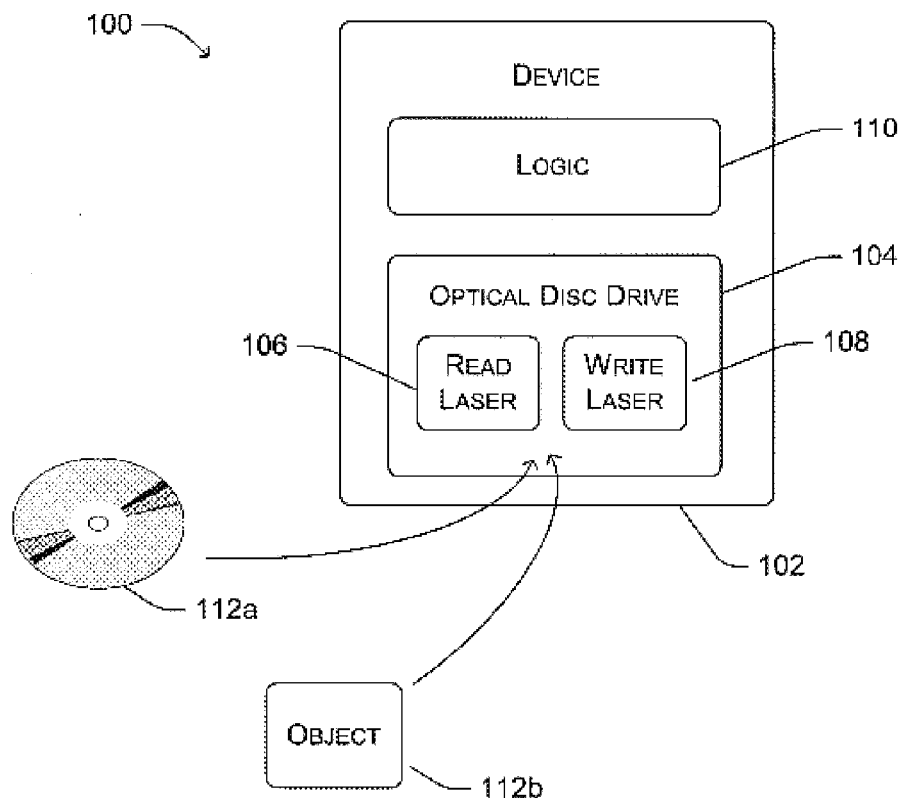
FIG. 1 is a block diagram depicting a device, having an optical disc drive, a writable label optical disc, and a representative writable label object, in accordance with certain exemplary implementations of the present invention.

FIG. 1 shows a computing environment 100 having a representative device 102. Device 102 includes an optical disc drive 104 having a read laser mechanism 106 and a write laser mechanism 108. Optical disc drive 104 is controlled by logic 110. Optical disc drive 104 is configured to receive a writable label disc 112a and/or other suitable writable label object 112b.

Here, logic 110 may include hardware, firmware and/or software that is/are configured to control optical disc drive 104 such that read laser mechanism 106 can read data from writable label disc 112a, for example, provided of course that data has been written thereto. Logic 110 is further configured to control the writing of data to writable label disc 112a for storage thereon. Logic 110 is further configured to control the writing of data to writable label disc 112a to create a visible label thereon, for example, as described in subsequent sections herein.

Figure 2:
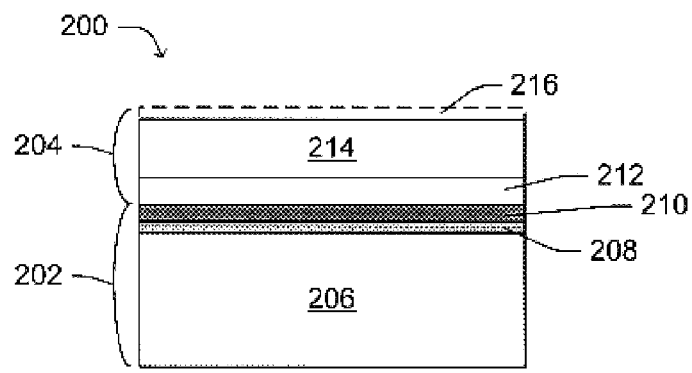
FIG. 2 is an illustrative representation showing a cross-sectional view of an exemplary conventional optical disc.

FIG. 2 shows a cross-sectional view of an exemplary conventional CD-R disc 200. CD-R disc 200 includes a data storage portion 202 and a protective portion 204. Within data storage portion 202 there is a transparent substrate layer 206, which is typically made of polycarbonate plastic, a dye layer 208, and a reflective layer 210. Within protective portion 204, there is a lacquer layer 212 and a polymer layer 214. An attached label 216 may be placed on polymer layer 214. Data can be stored on CD-R disc 200 by selectively altering dye layer 208 using write laser mechanism 108.

Figure 3A:
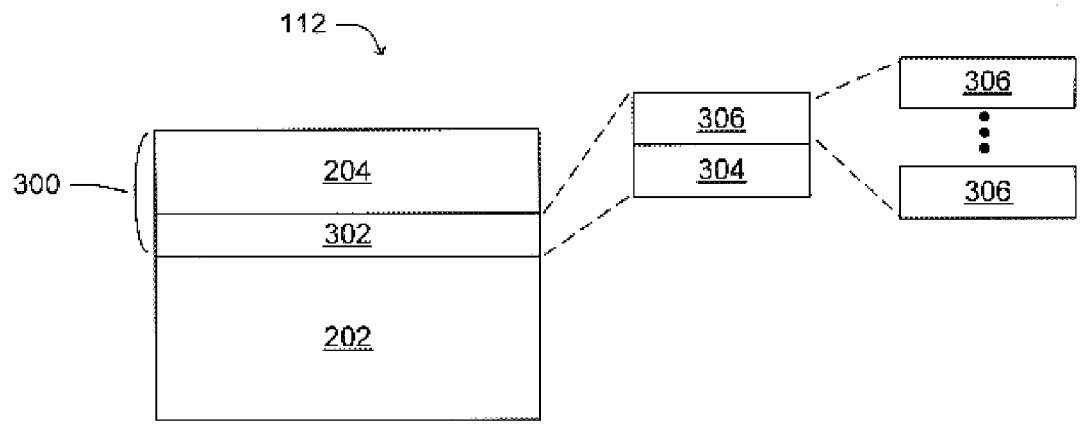
FIG. 3A is an illustrative representation showing a cross-sectional view of a writable label disc, in accordance with certain exemplary implementations of the present invention.

Reference is now made to FIG. 3A, which depicts a cross-sectional view of writable label disc 112, in accordance with certain exemplary implementations of the present invention.

Writable label disc 112 includes a data storage portion, such as, e.g., data storage portion 202, and a writable label portion 300. Writable layer portion 300 includes, in this example, at least one writable label layer 302 and a transparent protective portion, such as, e.g., protective portion 204.

In accordance with certain implementations of the present invention, writable label layer 302 includes material that can be visibly altered by selectively applying thermal energy to a large enough area using write laser mechanism 108. Thus, for example, writable label layer 302 may include dye material similar to dye layer 208. In this manner, portions of writable layer 302 can be visibly altered to form a label that is visible through protective portion 204.

In certain implementations, for example, when heated to a high enough temperature the dye material in writable label layer 302 can be configured to become substantially transparent making an underlying surface within data storage portion 202 visible through protective portion 204. Thus, in this example, reflective layer 212 (FIG. 2) would be made visible through the "burned" areas of writable label layer 302. Instead of dye material, writable label layer 302 may include, for example, celluloid material (e.g., thermal paper) or a phase changing material such as is used for storing data in CD-RW and DVD-RAM discs.

Conversely, in certain other implementations, for example, when heated to a high enough temperature the dye material in writable label layer 302 may be such that it becomes substantially opaque making an underlying surface within data storage portion 202 no longer visible through protective portion 204.

In certain other implementations, for example, when heated to a high enough temperature the dye or like material in writable label layer 302 can be configured to become either darker or lighter in shade, or otherwise change color, such that, when viewed through protective portion 204, there is a resulting visible contrast between burned areas and neighboring areas that have not been burned.

In accordance with still other exemplary implementations of the present invention writable label layer 302 can include a plurality of material layers. For example, writable label layer 302 may include an opaque label layer 304 and a thermally sensitive layer 306. Thermally sensitive layer 306 may include, for example, dye or other like materials as described above that can be configured to become transparent (or opaque) when viewed through protective portion 204 when burned. Consequently, certain areas of opaque label layer 304 will be visible through protective portion 204 and thermally sensitive layer 306.

Figure 3B:
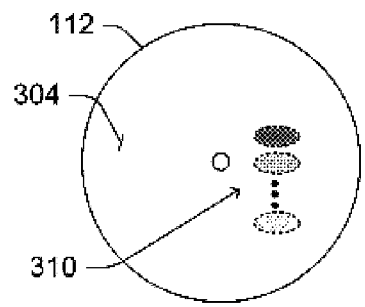
FIGS. 3B–C are illustrative representations showing certain features of a writable label disc, in accordance with certain exemplary implementations of the present invention.
Figure 3C:
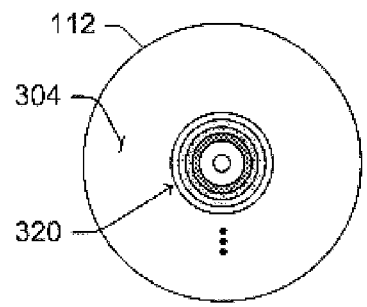

With this in mind, attention is now drawn to FIG. 3B and FIG. 3C. As illustrated in FIG. 3B, opaque label layer 304 may include a plurality of different color regions 310. Color regions 310 may be different colors and/or different gray tones, for example. If color regions 310 are small enough and arranged in a pattern that is known or detectable, e.g., based on a an absolute timing in pregroove (atip) and/or other readable feature, then similar to a cathode ray tube (CRT), areas of thermally sensitive layer 306 can be selectively burned to either reveal or hide particular color regions 310 when viewed through protective portion 204 and thermally sensitive layer 306. Thus, for example, color regions 310 may include red, green, and blue (RGB) regions, or cyan, magenta, yellow and black (CMYK) regions, and perhaps white regions too, that are arranged close enough to one another that a variety of visible color combinations may be created.

With this in mind, FIG. 3C demonstrates how concentric rings 320 may be employed to provide selectable color combinations. Note that the laser beams from conventional write laser mechanisms have a beam width of about 0.5 microns. Thus, the resolution that can be provided by writable label portion 300 (FIG. 3A) will be extremely high. Hence, the width of concentric rings 320 can be fairly small and a repeated pattern of different color/toned concentric rings can be used to provide pixel-like capabilities when writing the label. Here, for example, the spiraling track followed by write laser mechanism 108 when writing the label will cause it to crossover each of the concentric rings 320 at certain times/intervals during which the write laser can be selectively pulsed thereby effectively selecting/deselecting the underlying portion of a concentric ring 320 (or color region 310).

Returning now to FIG. 3A, as further illustrated, thermally sensitive layer 306 may include a plurality of thermally sensitive layers. For example, different dye material layers may be provided in thermally sensitive layer 306. Writable laser mechanism 108 would then be able to successively burn through these layers as needed to reveal or remove certain dye material layers, each of which may have a different color or tone, for example. Although not illustrated, it should be understood that writable label layer 302 may be similarly configured with a plurality of dye material layers.

Figure 3D:
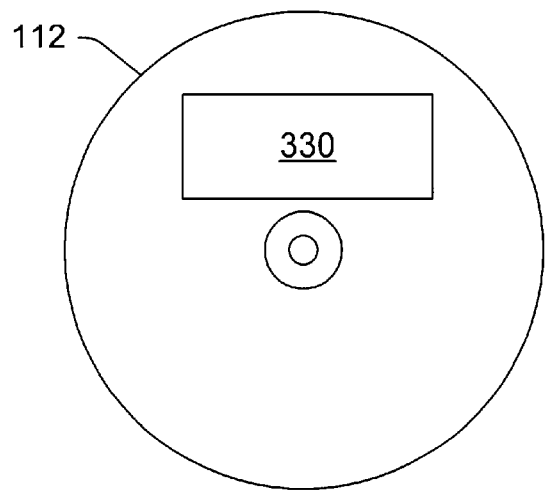
FIG. 3D is an illustrative representation showing a label formed on a writable label disc, in accordance with certain exemplary implementations of the present invention.

With the above exemplary methods and apparatuses in mind, FIG. 3D shows a writable label disc 112 having a laser written label 330 formed therein.

When a conventional optical disc drive 104 having one write laser mechanism 108 is used to write the label, the user will be required to position writable label disc 112 such that the laser beam will strike writable label layer 302. Thus, for example, in certain implementations of the present invention, the user would write data to the data storage portion 202 (i.e., the data storage side of the disc), then the user would flip the disc over and write to the writable label portion 300 (i.e., the labeling side).

In certain implementations, logic 110 can be configured to record information on the labeling side that is about the data written on the data side. It is noted that the data written to the labeling side of disc 112 can represent a variety of information including, for example, text, graphics and/or images.

Figure 4:
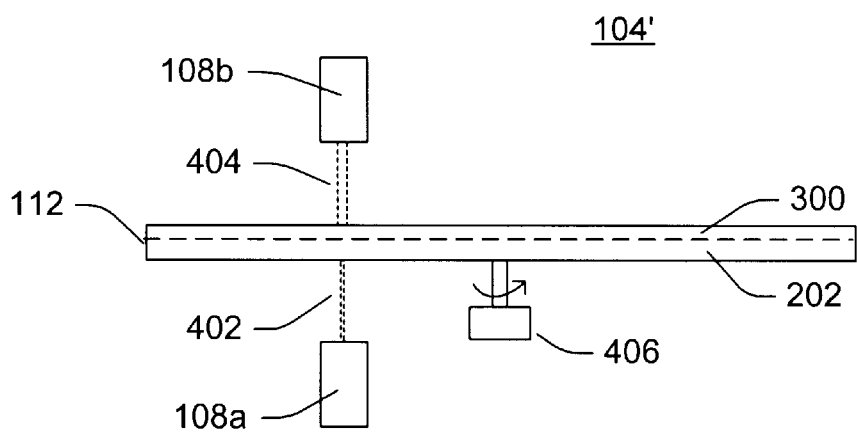
FIG. 4 is a block diagram depicting a writable label disc positioned within an optical disc drive having two write laser mechanisms, in accordance with certain further exemplary implementations of the present invention.

Attention is now directed towards FIG. 4, wherein an optical disc drive 104' is depicted as having a write laser mechanism 108a and a dedicated labeling write laser mechanism 108b. Here, the user would not need to flip writable label disc 112 over to write to the labeling side since labeling write laser mechanism 108b is already positioned as needed to write label data to writable label portion 300.

As illustrated, a disc rotational mechanism 406 is provided to rotate writable label disk 112 as needed. In certain implementations, write laser mechanism 108a and labeling write laser mechanism 108b can be of the same exact type, or different types. For example, a representative write laser beam 402 is shown as being emitted from write laser mechanism 108a, and a representative labeling write laser beam 404 is shown as being emitted from labeling write laser mechanism 108b. Here, as illustrated, the beam widths of write laser beam 402 and labeling write laser beam 404 may be different, as might also be their wavelengths and/or power levels. Thus, in certain implementations labeling write laser beam 404 may be significantly wider than write laser beam 402, since it is configured to write labels that are visible to users rather than write data that is readable by read laser mechanism 106 (FIG. 1).

Reference is made back to FIG. 1 and in particular to object 112b. Object 112b is representative of any suitable object that can be positioned within optical disk drive 102 and configured with a writable label layer 302 (FIG. 3A) or the like such that a laser written label 330 (FIG. 3D) can be formed on a writable label portion 300 (FIG. 3A). Thus, for example, a non-circular substantially planer object may be labeled per the above methods and apparatuses. Some exemplary objects include badge objects, business card objects, photo objects, decorative objects, entertainment objects, bookmark objects, and the like. These objects will have a laser written label 330 on at least one side and may also have laser readable data on the opposite side.

Although some preferred embodiments of the various methods and apparatuses of the present invention have been illustrated in the accompanying Drawings and described in the foregoing Detailed Description, it will be understood that the invention is not limited to the exemplary implementations disclosed, but is capable of numerous rearrangements, modifications and substitutions without departing from the spirit of the invention as set forth and defined by the following claims.

What is claimed is:

1. An apparatus suitable for use in an optical disc drive having a read laser mechanism and a write laser mechanism, the apparatus comprising:

a layer of support material having a first surface and a second surface;

a multiple-layer data storage structure suitable for storing data in a format that can be read by said read laser mechanism, said multiple-layer data storage structure being arranged on said first surface;

a layer of labeling material arranged on said second surface, said layer of labeling material having at least one color; and at least one layer of substantially opaque material arranged on said layer of labeling material, said at least one layer of substantially opaque material being configured to be written to by said write laser mechanism such that selected portions of said layer of labeling material are made visible through said at least one layer of substantially opaque material during a labeling process.

2. The apparatus as recited in claim 1, wherein said apparatus is substantially planer and circular in shape.

3. The apparatus as recited in claim 2, wherein said apparatus is an optical disc.

4. The apparatus as recited in claim 1, wherein said apparatus is substantially planer and non-circular in shape.

5. The apparatus as recited in claim 1, wherein said layer of labeling material has a plurality of regions, wherein at least two regions have different colors.

6. The apparatus as recited in claim 5, wherein said plurality of regions includes concentric rings.

7. The apparatus as recited in claim 1, wherein said at least one layer of substantially opaque material includes dye material that is visibly alterable by said write laser mechanism.

8. The apparatus as recited in claim 1, wherein said at least one layer of substantially opaque material includes polycrystalline structured material that is visibly alterable by said write laser mechanism.

9. The apparatus as recited in claim 1, wherein said at least one layer of substantially opaque material includes cellulose material that is visibly alterable by said write laser mechanism.

10. An apparatus suitable for use in an optical disc drive having a read laser mechanism and a write laser mechanism, the apparatus comprising:
    a layer of support material having a first surface and a second surface;
    a multiple-layer data storage structure suitable for storing data in a format that can be read by said read laser mechanism, said multiple-layer data storage structure being arranged on said first surface;
    a layer of labeling material arranged on said second surface, said layer of labeling material having at least one color; and
    at least one layer of substantially transparent material arranged on said layer of labeling material, said at least one layer of substantially transparent material being configured to be written to by said write laser mechanism such that selected portions of said layer of labeling material are made no longer visible through said at least one layer of substantially transparent material during a labeling process.

11. The apparatus as recited in claim 10, wherein said apparatus is substantially planer and circular in shape.

12. The apparatus as recited in claim 11, wherein said apparatus is an optical disc.

13. The apparatus as recited claim 10, wherein said apparatus is substantially planer and non-circular in shape.

14. The apparatus as recited in claim 10, wherein said layer of labeling material has a plurality of regions, wherein at least two regions have different colors.

15. The apparatus as recited in claim 14, wherein said plurality of regions includes concentric rings.

16. The apparatus as recited in claim 10, wherein said at least one layer of substantially transparent material includes dye material that is visibly alterable by said write laser mechanism.

17. The apparatus as recited in claim 10, wherein said at least one layer of substantially transparent material includes polycrystalline structured material that is visibly alterable by said write laser mechanism.

18. The apparatus as recited in claim 10, wherein said at least one layer of substantially transparent material includes cellulose material that is visibly alterable by said write laser mechanism.

19. A method for labeling an object using an optical disc drive having at least one write laser mechanism, the method comprising:
    positioning a label side of said object such that said label side can be written to by said at least one write laser mechanism;
    providing label data to said at least one write laser mechanism;
    selectively spinning said object; and
    causing said at least one write laser mechanism to write to and thereby visibly alter at least a portion of said label side based on said label data.

20. The method as recited in claim 19, wherein said object includes:
    a data side comprising a layer of support material having a first surface and a second surface and a multiple-layer data storage structure suitable for storing data in a format that can be read by a read laser mechanism, said multiple-layer data storage structure being arranged on said first surface; and
    wherein said label side includes a layer of labeling material arranged on said second surface, said layer of labeling material having at least one color and at least one layer of substantially opaque material arranged on said layer of labeling material, said at least one layer of substantially opaque material being configured to be written to by said write laser mechanism such that selected portions of said layer of labeling material are made visible through said at least one layer of substantially opaque material during a labeling process.

21. The method as recited in claim 20, wherein said layer of labeling material has a plurality of regions, wherein at least two regions have different colors.

22. The method as recited in claim 21, wherein said plurality of regions includes concentric rings.

23. The apparatus as recited in claim 20, wherein causing said at least one write laser mechanism to visibly alter at least a portion of said label side based on said label data includes visibly altering said at least one layer of substantially opaque material which includes at least one material selected from a group of materials comprising dye material, polycrystalline structured material, and cellulose material that is visibly alterable by.

24. The method as recited in claim 19, wherein said object includes:
    a data side comprising a layer of support material having a first surface and a second surface, and a multiple-layer data storage structure suitable for storing data in a format that can be read by said read laser mechanism, said multiple-layer data storage structure being arranged on said first surface; and
    wherein said label side includes a layer of labeling material arranged on said second surface, said layer of labeling material having at least one color, and at least one layer of substantially transparent material arranged on said layer of labeling material, said at least one layer of substantially transparent material being configured to be written to by said write laser mechanism such that selected portions of said layer of labeling material are made no longer visible through said at least one layer of substantially transparent material during a labeling process.

25. The method as recited in claim 24, wherein said layer of labeling material has a plurality of regions, wherein at least two regions have different colors.

26. The method as recited in claim 25, wherein said plurality of regions includes concentric rings.

27. The apparatus as recited in claim 24, wherein causing said at least one write laser mechanism to visibly alter at least a portion of said label side based on said label data includes visibly altering said at least one layer of substantially transparent material which includes at least one material selected from a group of materials comprising dye material, polycrystalline structured material, and cellulose material that is visibly alterable by.

28. The method as recited in claim 19, further comprising:
  writing data on a data side of said object using said at least one write laser mechanism.

29. The method as recited in claim 28, wherein providing label data to said at least one write laser mechanism includes:
  determining said label data based at least in part on content of said data to be written on said data side.

30. The method as recited in claim 28, wherein providing label data to said at least one write laser mechanism includes:
  determining said label data based at least in part on content of said data already written on said data side.

31. The method as recited in claim 19, wherein said optical disc drive includes a first write laser mechanism operatively configured to write said data on said data side and a second write laser mechanism operatively configured to write said label data on said label side, and wherein said first and second write laser mechanisms are operated simultaneously.

32. The method as recited in claim 19, wherein positioning said label side of said object such that said label side can be written to by said at least one write laser mechanism further includes:
  after writing data on a data side of said object using said at least one write laser mechanism, repositioning said object such that said label side of said object can be written to by said at least one write laser mechanism.

33. The method as recited in claim 19, wherein said object is substantially planer and circular in shape.

34. The method as recited in claim 33, wherein said object is an optical disc.

35. The method as recited claim 19, wherein said object is substantially planer and non-circular in shape.

36. A method comprising:
  positioning an optical disc having a label side and a data side into an optical disc drive having a write laser mechanism; and
  writing label data to said label side using said write laser mechanism.

37. The method as recited in claim 36, further comprising:
  prior to positioning said optical disc in optical disc drive, writing data to said data side using said write laser mechanism.

38. The method as recited in claim 36, further comprising:
  after writing said label data to said label side, repositioning said optical disc in optical disc drive; and then
  writing data to said data side using said write laser mechanism.

39. The method as recited in claim 36, wherein writing label data to said label side using said write laser mechanism further includes:
  selecting said label data based on data associated with the data side.

40. The method as recited in claim 36, wherein after being written to said data side is readable by a read laser mechanism and after being written to said label side is not readable by a read laser mechanism.

41. An optical disc drive comprising:
  a first write laser mechanism configured to write data to a data side of an optical disc; and
  a second write laser mechanism configured to write label data to a label side of an optical disc.

42. An apparatus for use with an optical data storage disc having a laser writable label side and a data side, the apparatus comprising:
  a write laser mechanism configurable to selectively apply a laser beam to said laser writable label side of said optical data storage disc based on label data; and
  logic operatively coupled to said write laser mechanism and configured to identify said label data and provide said label data to said write laser mechanism, wherein said label data corresponds to at least one feature to be formed by said write laser mechanism on said laser writable label side of said optical data storage disc.

43. A computer-readable medium having computer-executable instructions for performing acts comprising:
  identifying label data corresponding to at least one feature to be formed using a laser writable label side of an optical data storage disc having said laser writable label side and a data side; and
  providing said label data to a write laser mechanism configurable to selectively apply a laser beam to said laser writable label side of an optical data storage disc based on said label data.

* * * * *